United States Patent
Moon et al.

(10) Patent No.: US 9,731,191 B2
(45) Date of Patent: Aug. 15, 2017

(54) SYSTEM AND METHOD FOR PROVIDING MARBLE GAME

(71) Applicants: NETMARBLE GAMES CORPORATION, Seoul (KR); NETMARBLE N2 INC., Seoul (KR)

(72) Inventors: Lee Ho Moon, Goyang-si (KR); Jeong Ho Choi, Seoul (KR)

(73) Assignees: NETMARBLE GAMES CORPORATION, Seoul (KR); NETMARBLE N2 INC., Seoul (KR)

( * ) Notice: Subject to any disclaimer, the term of this patent is extended or adjusted under 35 U.S.C. 154(b) by 861 days.

(21) Appl. No.: 13/627,292

(22) Filed: Sep. 26, 2012

(65) Prior Publication Data
US 2014/0057715 A1    Feb. 27, 2014

(30) Foreign Application Priority Data
Aug. 21, 2012    (KR) ........................ 10-2012-0091407

(51) Int. Cl.
*A63F 9/24*    (2006.01)
*A63F 13/00*   (2014.01)
(Continued)

(52) U.S. Cl.
CPC .......... *A63F 13/005* (2013.01); *A63F 13/335* (2014.09); *A63F 13/46* (2014.09);
(Continued)

(58) Field of Classification Search
CPC ........ A63F 13/005; A63F 13/10; A63F 13/12; A63F 2300/807; A63F 13/20; A63F 13/822
(Continued)

(56) References Cited

U.S. PATENT DOCUMENTS 2,244,762 A * 6/1941 Braymiller .......... A63F 3/00176
                                                    122/235.33
3,791,649 A * 2/1974 Gold ................... A63F 3/00214
                                                         273/239
(Continued)

OTHER PUBLICATIONS

Naver Blog; *Classic Board Game, Monopoly, Introduced To [iPhone Games]*; posted on Sep. 7, 2010; <URL: http://blog.naver.com/ohsakr/140115370961> Webpage printout including English translation; 8 Pages.

(Continued)

*Primary Examiner* — William H McCulloch, Jr.
*Assistant Examiner* — Chase Leichliter
(74) *Attorney, Agent, or Firm* — Lewis Roca Rothgerber Christie LLP

(57) ABSTRACT

Disclosed is a system and method for providing a marble game. The system for providing the marble game may provide a game board formed by aligning blocks, support a configuration of an occupied city block group by grouping city blocks in an identical color or city blocks aligned adjacent to each other, when a city block set as the occupied city block group is occupied associated with a first terminal, the system for providing the marble game may increase a toll by applying a weight to the toll of the city block, increase a subtraction with respect to an amount held by a second terminal and an accumulation with respect to an amount held by the first terminal, and provide a tension to a game.

27 Claims, 9 Drawing Sheets

Top ranking         Second ranking

(51) Int. Cl.
*A63F 13/46* (2014.01)
*A63F 13/69* (2014.01)
*A63F 13/80* (2014.01)
*A63F 13/335* (2014.01)
*A63F 13/30* (2014.01)
*A63F 13/822* (2014.01)
*A63F 13/20* (2014.01)
*A63F 3/00* (2006.01)

(52) U.S. Cl.
CPC .............. *A63F 13/69* (2014.09); *A63F 13/80* (2014.09); *A63F 3/00072* (2013.01); *A63F 13/20* (2014.09); *A63F 13/30* (2014.09); *A63F 13/822* (2014.09)

(58) Field of Classification Search
USPC ........................................ 463/1, 9, 30–31, 42
See application file for complete search history.

(56) References Cited

U.S. PATENT DOCUMENTS

| | | | | |
|---|---|---|---|---|
| 4,188,034 | A * | 2/1980 | Dempsey | A63F 3/00097 273/145 C |
| 5,263,715 | A * | 11/1993 | Matsumoto | A63F 9/0468 273/145 R |
| 2006/0220314 | A1* | 10/2006 | Chung | A63F 3/00176 273/241 |
| 2007/0235931 | A1* | 10/2007 | Simmons, II | A63F 3/00063 273/256 |
| 2008/0252007 | A1* | 10/2008 | Baker et al. | 273/242 |
| 2010/0045475 | A1* | 2/2010 | Wang | A63F 9/0468 340/686.1 |
| 2011/0028220 | A1* | 2/2011 | Reiche, III | 463/42 |
| 2012/0231889 | A1* | 9/2012 | Lee | A63F 13/352 463/42 |
| 2013/0005473 | A1* | 1/2013 | Bethke et al. | 463/42 |
| 2013/0281189 | A1* | 10/2013 | Gagner et al. | 463/25 |

OTHER PUBLICATIONS

Kangshinwook.com; "Chap. 2" [*Description of Game*] *Monopoly, a Byword for Board Games*; posted on Oct. 20, 2011; <URL: http://kangshinwook.com/index.php?document_srl=13418&mid=gagamel01> Webpage printout including English translation; 16 Pages.

Korean Office Action issued by Korean Patent Office on Nov. 27, 2013, for the corresponding Korean Patent Application No. 10-2012-0091407; 5 Pages.

CJ E&M Corp, 'Everybody's Marble' Pre-Open Beta Test Infoimation, homepage Pop-up, Sep. 28, 2011; p. 1; CJ E&M Corp Seoul, Korea, Test period: Thursday, Sep. 29, 2011-Tuesday, Oct. 4, 2011; Server open period: Daily 17:00-22:00.

CJ E&M Corp, 'Everybody's Marble' Pre-Open Service Information, homepage Pop-up, May 15, 2012; p. 1; CJ E&M Corp Seoul, Korea, Pre-Open Service Period: Wednesday May 16, 2012-Friday May 18, 2012; Server open period: Open Wednesday May 16 17:00-Close May 18 22:00.

CJ E&M Corp, 'Everybody's Marble' Formal Service Open Information, homepage Pop-up, May 23, 2012; p. 1; CJ E&M Corp Seoul, Korea, Formal Service Open schedule: May 23, 15:00.

* cited by examiner

SYSTEM AND METHOD FOR PROVIDING MARBLE GAME

CROSS-REFERENCE TO RELATED APPLICATION

This application claims priority of Korea, Republic of patent Application No. 10-2012-0091407, filed on Aug. 21, 2012.

TECHNICAL FIELD

The present invention relates to a system and method for providing a marble game, and more particularly, to a system and method for providing a marble game that provides a game board formed by aligning blocks, allows a winner to be determined by various rules, and stimulate entertainment and interest in the marble game.

RELATED ART

With a rapid distribution of the Internet, a variety of games played offline are being made available online. An example of one such game may include an online marble game.

A marble game provided online has seen a surge in growth, in terms of market expansion and distribution speed, due to the marble game supporting a marble game service irrespective of time and space among multiple users located in remote locations.

However, most marble games currently available online may be restricted to embodying a conventional marble game method in an online environment in which a game board is formed by aligning city blocks to a terminal simultaneously, and buildings are constructed on occupied city blocks.

Such a current marble game may be easy for users newly introduced to an online game to enjoy, along with multiple users already familiar with rules of the game. Nonetheless, due to basic rules of the game and an increasing difference in an amount of assets held by each of the terminals, as a winner is determined by comparing the amount assets held by each of the terminals, the game may fail to maintain entertainment or excitement factors when an outcome of the game can be easily predicted prior to an end of the game.

DESCRIPTION OF THE INVENTION

Subject to be Solved

An aspect of the present invention provides a game board formed by aligning blocks, supports grouping with respect to city blocks of an identical color or city blocks aligned adjacent to each other, and when the grouped city blocks in association with a first terminal are occupied, subtraction of an amount held by a second terminal located in the grouped city blocks and an accumulation of an amount held by the first terminal may be increased by applying a weight to a toll of the city blocks for a toll increase, thereby providing a tension to a game.

Another aspect of the present invention also provides a game board formed by aligning blocks, and determines a winner by various rules, for example, an occupying rule of a city block or a tourist site block, aside from the determination of the winner based on a result of comparing amounts held by each terminal subsequent to passing a predetermined game time or a game turn, thereby encouraging entertainment and interest in a game due to an unpredictability of the game prior to an end of the game.

Solutions

According to an aspect of the present invention, there is provided a system for providing a marble game, the system including a game database to store data related to a plurality of characters, a plurality of city blocks, a toll levied corresponding to the plurality of city blocks, and a game board formed by aligning the plurality of city blocks, a network connection unit to connect a first terminal and a second terminal in conjunction with a request to participate in a game, extract a first character corresponding to the first terminal and a second character corresponding to the second terminal from the game database, and provide the first character, the second character, and a screen related to the game board to the first terminal and the second terminal, and a marble game server to determine a city block landed on by the first character sequentially in the plurality of city blocks to be an occupied city block associated with the first terminal, and set a plurality of occupied city blocks satisfying a predetermined property as an occupied city block group by grouping the plurality of occupied city blocks, wherein the marble game server calculates an amount to be paid by applying a first weight to a toll obtained from the game database corresponding to the occupied city block when the city block landed on by the second character sequentially in the plurality of city blocks is an occupied city block group.

According to another aspect of the present invention, there is provided a system for providing a marble game, the system including a network connection unit to connect a first terminal and a second terminal in conjunction with a request to participate in a game, extract a first character corresponding to the first terminal and a second character corresponding to the second terminal, and provide a screen related to a game board formed by aligning the first character, the second character, and a plurality of city blocks to the first terminal and the second terminal, and a marble game server to place an inquiry with the first terminal to determine whether a landmark is constructed when a villa, a building, and a hotel are constructed in a city block landed on by the first character sequentially in the plurality of city blocks, and when a command for constructing the landmark is input from the first terminal, update the user database to reflect that a building fee with respect to the landmark is subtracted from the amount held by the first terminal, and construct the landmark in lieu of the villa, the building, and the hotel.

According to still another aspect of the present invention, there is provided a system for providing a marble game, the system including a network connection unit to connect a first terminal and a second terminal in conjunction with a request to participate in a game, extract a first character corresponding to the first terminal and a second character corresponding to the second terminal, and provide a screen related to a game board formed by aligning the first character, the second character, and a plurality of city blocks to the first terminal and the second terminal, and a marble game server to place an inquiry with the first terminal to determine whether the occupied city block is purchased when a city block landed on by the first character in the plurality of city blocks, and when a command for purchasing a city is input from the first terminal, update the user database to reflect an amount to be paid obtained by applying a second weight to a toll found in the game database corresponding to the occupied city block is subtracted from the amount held by the first terminal to be added to the amount held by the second terminal, and determine the city block to be the occupied city block associated with the first terminal.

According to yet another aspect of the present invention, there is provided a method for providing a marble game, the method including storing data related to a game board formed by aligning a plurality of characters, a plurality of city blocks, a toll levied corresponding to the plurality of city blocks, and a game board formed by aligning the plurality of city blocks, connecting a first terminal and a second terminal in conjunction with a request to participate in a game, and extracting a first character corresponding to the first terminal and a second character corresponding to the second terminal from the game database, providing the first character, the second character, and a screen related to the game board to the first terminal and the second terminal, determining a city block landed on by the first character sequentially in the plurality of city blocks to be an occupied city block associated with the first terminal, setting a plurality of occupied city blocks satisfying a predetermined property as an occupied city block group by grouping the plurality of occupied city blocks, and calculating an amount to be paid by applying a first weight to a toll found in the game database corresponding to the occupied city block when a city block landed on by the second character sequentially in the plurality of city blocks is the occupied city block group.

Effect of the Invention

According to embodiments of the present invention, it is possible to provide a game board formed by aligning blocks, support grouping with respect to city blocks of an identical color or city blocks aligned adjacent to each other, and when the grouped city blocks in association with a first terminal are occupied, a subtraction with respect to an amount held by a second terminal and an accumulation with respect to an amount held by the first terminal are increased by applying a weight on a toll of the city blocks for a toll increase, thereby adding a sense of tension to a game.

According to embodiments of the present invention, it is possible to provide a game board formed by aligning blocks, and determine various rules, for example, an occupying rule with respect to a city block or a tourist block, aside from the determination of a winner based on a result of a comparison of an amount held by each terminal subsequent to passing of a predetermined game time or a game turn, thereby encouraging entertainment and interest in a game due to an unpredictability of the winner prior to an end of the game.

DETAILED DESCRIPTION

Figure 1:
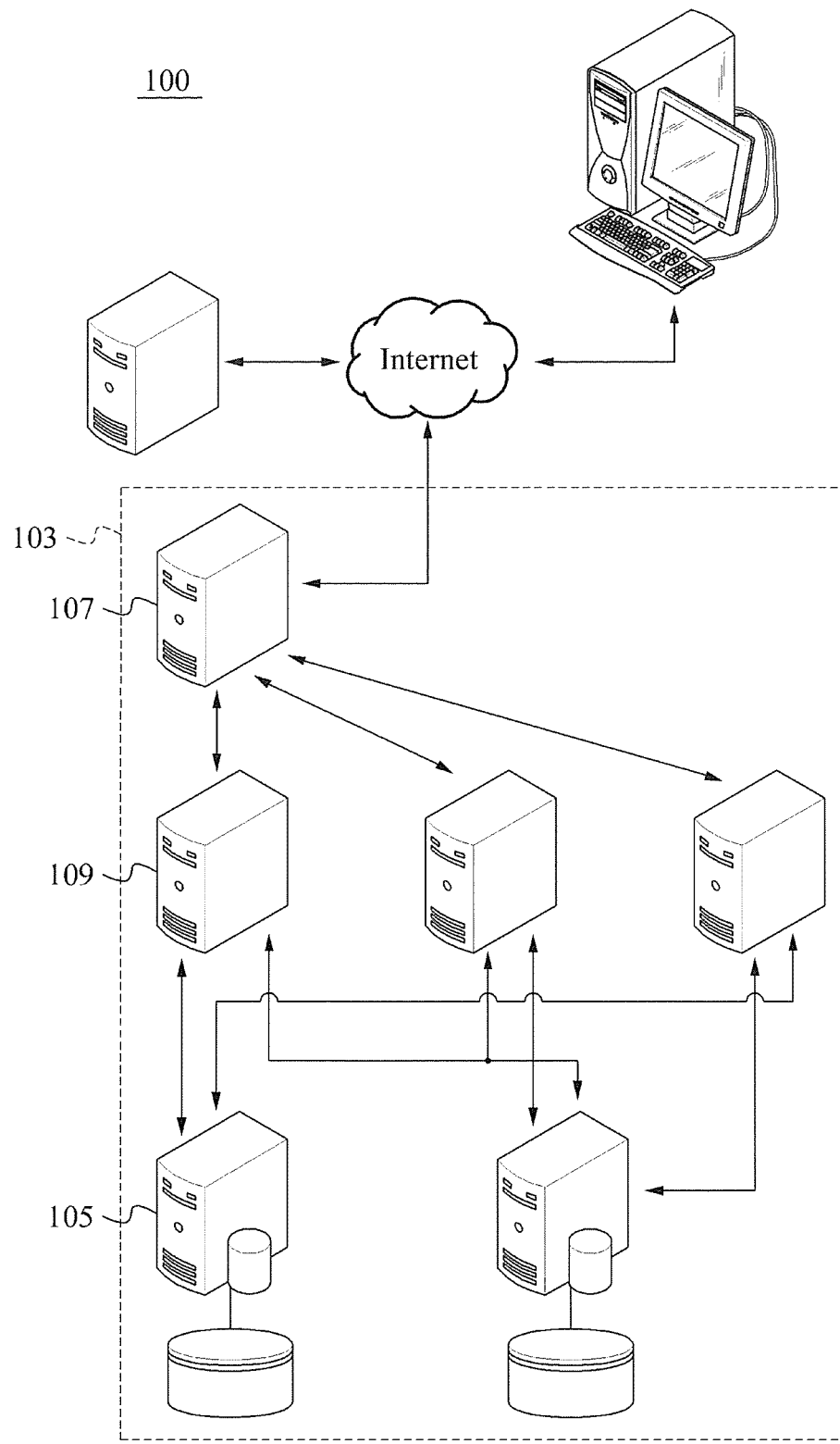
FIG. 1 is a diagram illustrating a game network including a system for providing a marble game according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A system for providing a marble game according to an embodiment of the present invention will be described based on a marble game played among a plurality of users located in an online-based game for convenience, particularly, remotely on a network. However, it will be apparent to those skilled in the art that it is possible for the spirit or scope of the invention to be applied to a personal computer (PC)-based game, a video console-based game, and the like, as well as the online-based game.

FIG. 1 is a diagram illustrating a game network 100 including a system for providing a marble game according to an embodiment of the present invention.

Referring to FIG. 1, the game network 100 may provide an online marble game played between a terminal 101 and the system for providing the marble game 103.

The system for providing the marble game 103 may include a database 105, a network connection unit 107, and a marble game server 109.

The terminal 101 may be interpreted as a computer terminal that enables a user to connect to a network, and that is readily available for establishing an online connection.

The database 105 may store online connection information, for example, identification and password information related to a user, such that the network connection unit 107 (e.g., a server as shown) may authenticate an online connection, and support an authentication of a user by providing the online connection information at a request of the network connection unit 107.

Further, the database 105 may further store user information fundamental for a game, for example, an amount held in a user account, nickname information, personal information, and the like, and a game board to be provided to the terminal 101 such that the marble game server 109 may provide the authenticated user with the online marble game.

The network connection unit 107 may log in to a network to authenticate the online connection of the terminal 101 to which establishing an online connection is intended, by referring to the online connection information stored in the database 105 to participate in the marble game. Also, the network connection unit 107 may connect a first terminal and a second terminal in conjunction with a request to participate in a game, and provide a first character corresponding to the first terminal, a second character corresponding to the second terminal, and a screen related to the game board.

The marble game server 109 may provide a marble game service based on rules of the game selected by the terminal 101 authenticated in the network connection unit 107.

More particularly, the marble game server 109 may provide a game board formed by aligning various blocks, simultaneously, to each terminal 101 authenticated for the online connection, based on the user information, determine a winner based on a result of a comparison of an amount held for each terminal subsequent to a predetermined game time or a game turn, or based on various rules, for example, an occupation rule with respect to a city block or a tourist site block, thereby stimulating entertainment and interest due to an unpredictability of a game result prior to an end of the game. As used herein, the "game turn" may indicate a cycle of moving a character according to a predetermined order, for example, by using a dice button at least once.

When a plurality of marble game servers is present, the network connection unit 107 may set each of the plurality of marble game servers as respective channels, and allow the marble game server corresponding to a channel to be in conjunction with the terminal 101, by a user selecting a specific channel among multiple channels.

Figure 2:
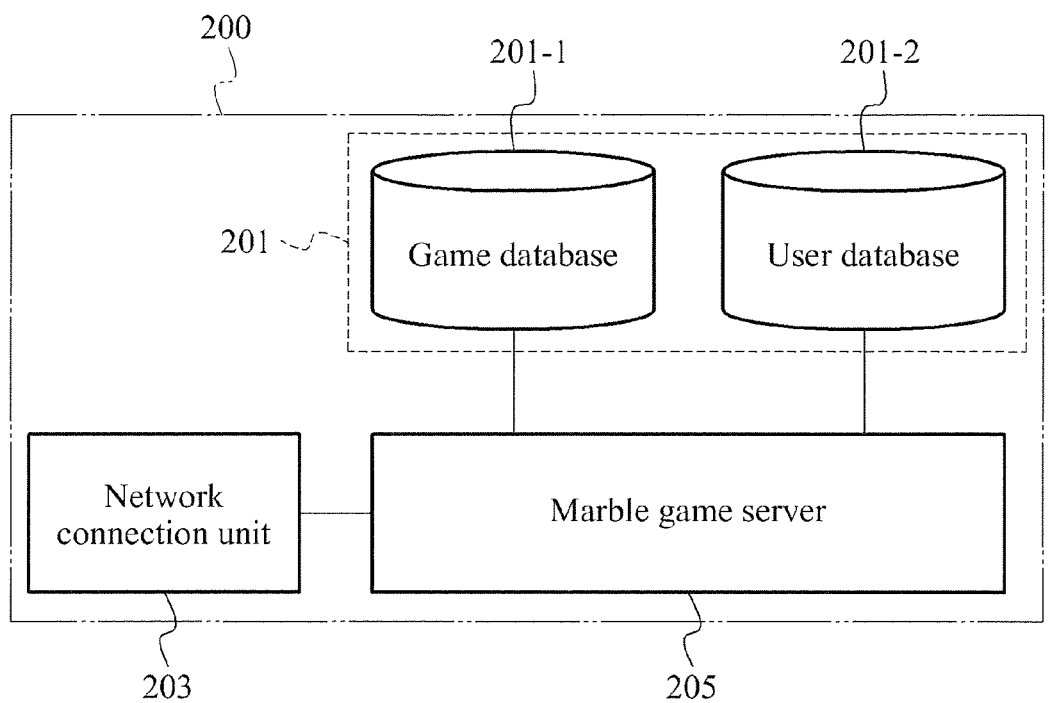
FIG. 2 is a diagram illustrating a configuration of a system for providing a marble game according to an embodiment of the present invention.

FIG. 2 is a diagram illustrating a configuration of a system for providing a marble game 200 according to an embodiment of the present invention.

Referring to FIG. 2, the system for providing the marble game 200 may include a database 201, a network connection unit 203 (e.g., a server), and a marble game server 205.

The database 201 may include a game database 201-1 and a user database 201-2.

The game database 201-1 may store data related to at least one of a plurality of characters, a plurality of city blocks, a toll levied corresponding to the plurality of city blocks, and a game board formed by aligning a block including the plurality of city blocks.

Here, the game board may be formed by aligning at least one of a departure point block, a tourist site block, a deserted island block, an Olympic block, a world travel block, a Macau block, a National Tax Service block, and a chance card block in sequence along with the plurality of city blocks. Also, each block in the game board may be formed as a moving path via which a character provided to a terminal moves, through being aligned in a form of, for example, a polygon or a circle.

Further, the toll may be changed by the marble game server 205, based on at least one of a property fee, a building fee, and an event fee, for example, a fee for hosting a festival or the Olympics.

As used herein, the "property fee" may indicate a fee required for determining a city block on which the character lands to be owned by the terminal, that is, an occupied city block. The "building fee" may indicate a fee required for constructing a building such as a villa, a building, a hotel, and a landmark, on the occupied city block. The toll for a corresponding city block may be determined by utilizing a total fee calculated by determining a sum of the property fee and the building fee.

Also, "the event fee" may indicate a fee required for levying the toll by applying a weight, for example, two times greater, to the toll, such as a fee paid for hosting the Olympics in a specific city block.

The property fee, the building fee, and the event fee corresponding to each of the city blocks may be stored in the game database 201-1, and updated periodically or as necessary by the marble game server 205.

The user database 201-2 may store an amount held by a first terminal and a second terminal associated with the game, and may be changed based on a payment with respect to at least one of the property fee, the building fee, the event fee, and the toll with respect to the city block.

The network connection unit 203 may connect the first terminal and the second to terminal in conjunction with a request to participate in the game, extract a first character corresponding to the first terminal a second character corresponding to the second terminal from the game database 201-1, and provide the first character, the second character, and a screen related to the game board to the first terminal and the second terminal. Here, the first terminal may indicate a terminal owned by a random user, the second terminal may indicate a terminal owned by a user other than the random user, and the second terminal may be plural according to embodiments of the present invention.

The marble game server 205 may position the first character corresponding to the first terminal and the second character corresponding to the second terminal participating in the game in the departure point block at a start of the game, and determine a game order of the first terminal and the second terminal through a card selection.

Also, the marble game server 205 may select a festival city in advance as a festival is hosted in a portion of city blocks in the game board, at the start of the game. Here, the marble game server 205 may select the festival city among the city blocks in the game board randomly, and set a weight, for example, by n multiples, n being an integer greater than "1", to be applied to the toll for each selected festival city. For example, the marble game server 205 may select the festival city with respect to three blocks among the city blocks randomly with the start of the game, and heighten a tension of the game by informing a game participant through setting off fireworks over the game board.

The marble game server 205 may move the first character corresponding to the first terminal and the second character corresponding to the second terminal along the moving path on the game board, based on the rules of the game. For example, the marble game server 205 may move the first character or the second character, corresponding to a resulting value of dice rolled by the first terminal or the second terminal. Here, the dice may be greater than or equal to "1". For example, when resulting values of two dice rolled are identical, that is, so called doubles, the marble game server 205 may provide an option of rolling the dice once again.

In this instance, the marble game server 205 may control a resulting value of the dice based on a gauge control with respect to the rolling of the dice, for example, holding down a dice button for an overly long period of time to obtain a high value or clicking on the dice button for a short period of time to obtain a low value, or a selection of an odd/even number, for example, clicking on an odd number command to obtain a resulting value of an odd number or clicking on an even number command to obtain a resulting value of an even number.

When the first character provided to the first terminal moves according to the rules of the game, the marble game server 205 may execute a variety of game events, based on a type of block landed on by the first character, for example, a city block, a tourist site block, a deserted island block, an Olympic block, a world travel block, a Macau block, a National Tax Service block, or a chance card block.

The marble game server 205 may place an inquiry with the first terminal to determine whether a city block landed on by the moved first character is purchased, for example, a city block for each nation. Also, when a command for purchasing a city is input from the first terminal, the marble game server 205 may update the user database 201-2 to reflect that a property fee with respect to the city block is subtracted from an amount held by the first terminal, and determine the city block to be an occupied city block associated with the first terminal. Here, a building may be constructed in the occupied block associated with the first terminal, and subsequently when the second character corresponding to the second terminal is located on the occupied city block, the toll may be levied to the second terminal.

When the first character moved according to the rules of the game lands on the tourist site block, for example, an island block, or a beach block, the marble game server 205 may place an inquiry with the first terminal to determine whether the tourist site block landed on by the first character is purchased. Also, when a command for purchasing a tourist site is input from the first terminal, the marble game server 205 may update the user database 201-2 to reflect that the property fee with respect to the tourist site block is subtracted from the amount held by the first terminal, and determine the tourist site block to be an occupied tourist site block associated with the first terminal. Here, when the second character corresponding to the second terminal is located on the occupied tourist site block like the occupied city block, the occupied tourist site block may levy the toll on the second terminal, while restricting a construction of a building subsequently.

When the first character moved according to the rules of the game lands on the deserted island block, the marble game server 205 may restrict a movement of the first character during a predetermined game turn, for example, three turns, or allow an escape from the deserted island block through a specific scheme, for example, paying an escape fee, using an escape card, and the like, when resulting values of two dice are identical, that is, so called doubles.

When the first character moved according to the rules of the game lands on the Olympic block, the marble game server 205 may place an inquiry with the first terminal to determine whether the Olympics is being hosted by a desired city, for example, one of the occupied city blocks associated with the first terminal. Also, when a command for hosting the Olympics is input from the first terminal, the marble game server 205 may update the user database 201-2 to reflect that the event fee with respect to the hosting the Olympics is subtracted from the amount held by the first terminal, and increase the toll with respect to the city by weight multiples. Further, when hosting of the Olympics is input with respect to a single specific city block repeatedly, the marble game server 205 may increase a corresponding toll by multiples based on a number of repeated inputs.

For example, when the command for hosting the Olympics with respect to a city block "Seoul", of which a toll is 200 million, is repeatedly input "five times" by the first terminal, and the second character corresponding to the second terminal is located on the city block "Seoul", the marble game server 205 may pay the toll of 2,000 million obtained by multiplying an original toll of 200 million by "10" obtained through multiplying a weight multiple of two by the five times from the second terminal to the first terminal.

Aside from purchasing the Olympic block, an opportunity to host the Olympics may be provided to a specific terminal through drawing a related a chance card.

When the first character moved according to the rules of the game lands on the world travel block, the marble game server 205 may move the first character to a desired block.

When the first character moved according to the rules of the game lands on the Macau block, the marble game server 205 may provide a reward through a random game. For example, the marble game server 205 may provide the reward by determining whether a card number of each card aligned is higher or lower than a predetermined number, and update the user database 201-2 to reflect that the provided reward is added to the amount held by the first terminal.

When the first character moved according to the rules of the game lands on the National Tax Service block, the marble game server 205 may collect a portion of real estate owned by the first terminal, for example, 5% of an occupied city, a building, or a tourist site, and update the user database 201-2 to reflect that the collected fee is subtracted from the amount held by the first terminal.

When the first character moved according to the rules of the game lands on the chance card block, the marble game server 205 may allow the first character to use the chance card. In this instance, the marble game server 205 may provide, to the first terminal, a single card selected at random from the chance cards that create various types of events, for example, offensive chance cards such as "compulsory disposal by sale", "yellow dust", "earthquake", and "city change", defensive chance cards such as "shield", "angel", and the like.

For example, when the "compulsory disposal by sale" chance card is selected when the first character lands on the chance card block, the marble game server 205 may allow the first terminal to select a city block from the occupied city blocks associated with the second terminal, and reduce real estate holdings of the second terminal through a compulsory sale of the selected city block.

When the "yellow dust" chance card is selected when the first character lands on the chance card block, the marble game server 205 may allow the first terminal to select a city block from the occupied city blocks associated with the second terminal, and restrict an increase of the amount held by the second terminal with respect to the selected city block by exempting the first terminal from paying the toll, aside from a case in which the first terminal or any terminal other than the second terminal lands on the selected city block during a predetermined game turn.

When the "earthquake" chance card is selected as the first character lands on the chance card block, the marble game server 205 may allow the first terminal to select a city block from the occupied city blocks associated with the second terminal, and reduce the real estate holdings of the second terminal by destroying a building constructed in the selected block. Here, the marble game server 205 may demolish a hotel, a building, and a villa one by one in such an order, and when a landmark is constructed, an effect of the "earthquake" chance card may be invalidated such that the landmark is not demolished.

When the "city change" chance card is selected as the first character lands on the chance card block, the marble game server 205 may allow the first terminal to select a city block of relatively low asset value, for example, a city block with a low toll, from the occupied city blocks associated with the first terminal, select a city block of relatively high asset value, for example, a city block with a high toll, or a city block on which a landmark is constructed, from the occupied city block associated with the second terminal, and reduce the real estate holdings of the second terminal by exchanging each of the selected city blocks while increasing real estate holdings of the first terminal.

When a defensive chance card such as the "shield" chance card is selected as the first character lands on the chance card block, the marble game server 205 may allow the first terminal to hold the "shield" chance card. Further, when the second terminal intends to use an offensive chance card, the marble game server 205 may invalidate an effect of the offensive chance card by using the "shield" chance card held by the first terminal.

Also, when the "earthquake" chance card is selected as the first character lands on the chance card block, the marble game server 205 may allow the first terminal to hold the "angel" chance card. Further, when the second terminal intends to use the offensive chance card, the marble game server 205 may reduce an effect of the offensive chance card by using the "angel" chance card held by the first terminal. For example, when the second terminal uses the "yellow dust" chance card and the first terminal uses the "angel" chance card on the city block selected by the second terminal from the occupied city blocks associated with the first terminal, the marble game server 205 may subtract a half of a toll from the amount held by the second terminal when the second terminal is located on the selected city block to add the half of the toll levied corresponding to the city block in the amount held by the first terminal.

Also, the marble game server 205 may provide a character card that has an ability to provide strategic benefits in game playing to a terminal, through subtracting money obtained in the game by the terminal, for example, the amount held by the terminal, in response to a request from the terminal to purchase a character card. Here, the marble game server 205 may provide character cards with various abilities at random or through an exchange of a combination of the character cards for another character card.

When the first character moved according to the rules of the game lands on the city block, the marble game server 205 may determine a city block to be the occupied city block associated with the first terminal subsequent to being purchased, and set a plurality of occupied city blocks satisfying a predetermined property as an occupied city block group by grouping the plurality of occupied city blocks. That is, the marble game server 205 may determine the city block landed on by the first character sequentially in a plurality of city blocks on the game board to be the occupied city block associated with the first terminal, and set the plurality of occupied city blocks satisfying the predetermined property as the occupied city block group by grouping the plurality of occupied city blocks. Here, the marble game server 205 may set each city block as the occupied city block group by determining that the predetermined property is satisfied when a color is assigned to the each city block, each plurality of city blocks to which an identical color is assigned is determined to be an occupied city block, or at least n pluralities of city blocks aligned adjacent to each other, n being a natural number greater than or equal to "3", are each determined to be occupied city blocks. For example, when each of a "first blue city block", a "second blue city block", and a "third blue city block" are determined to be the occupied city blocks, the marble game server 205 may set the "first blue city block, the second blue city block, and the third blue city block" as the occupied city block group by determining that the predetermined property is satisfied. As used herein, the predetermined property may refer to measures to define each block specifically and examples of the predetermined property may include a color, a continent, and the like. When the city block landed on by the second character in the plurality of blocks on the game board according to the rules of the game is the occupied city block occupied by the first terminal, the marble game server 205 may update the user database 201-2 to reflect that the toll applied to the occupied city block is subtracted to be added to the amount held by the first terminal.

Here, the marble game server 205 may utilize at least one of a property fee paid in determining the city block to be the occupied city block, a building fee with respect to a building constructed in the occupied city block, and an event fee involved in hosting a festival or the Olympics in the occupied city block, when calculating the toll corresponding to the occupied city block, and update the game database 201-1 to store the calculated toll. For example, when the city block "Seoul" is selected, at a start of the game, to be a festival city to which a weight multiple of two is applied, the marble game server 205 may calculate the toll by applying the "two multiples" to a "first toll" levied corresponding to the city block "Seoul".

Also, when the Olympics is hosted in the city block "Seoul" selected as the festival city, the marble game server 205 may calculate the toll by applying "four multiples" to the "first toll" levied corresponding to the city block "Seoul", that is obtained by applying the "two multiples" of the weight involved in hosting the Olympics and the "two multiples" of the weight involved in the festival city.

Further, when the city block landed on by the second character sequentially in the plurality of city blocks on the game board is the occupied city block group, the marble game server 205 may calculate an amount to be paid by applying a first weight, for example, two multiples, to the toll found in the game database 201-1 corresponding to the occupied city block. The marble game server 205 may update the user database 201-2 to reflect that the calculated amount to be paid is subtracted from the amount held by the second terminal to be added to the amount held by the first terminal, as a toll to be paid by the second terminal, that is, an amount obtained by applying the first weight to the toll corresponding to the city block.

That is, when the city block landed on by the second character is the occupied city block associated with the first terminal rather than the occupied city block group, the marble game server 205 may allow the second character to pay only the toll applied to the occupied city block. Conversely, when the city block landed on by the second character is the occupied city block associated with the first terminal and the occupied city block group, the marble game server 205 may allow the second character to pay an amount obtained by applying the toll to the occupied city block to which the first weight is applied, and create a sense of tension in the game by providing an environment where winning may be reversed by increasing an accumulation of the amount held by the first terminal and a subtraction of the amount held by the second terminal.

Here, when the occupied city block "Seoul" associated with the first terminal is selected to be the festival city at the start of the game such that the weight by "two multiples" is applied to the toll, and when the city block "Seoul" is included in the occupied city block group again such that the weight of "two multiples" is applied to the toll, the marble game server 205 may calculate the amount to be paid by applying "four (2*2) multiples" to the "first toll" levied corresponding to the city block "Seoul".

Also, when the Olympics is hosted in the city block "Seoul" additionally, the marble game server 205 may calculate the amount to be paid by applying "eight (2*2*2)

multiples" to the "first toll" levied corresponding to the city block "Seoul", by applying an additional weight by "two multiples" to the toll.

When the amount held by the second terminal is less than the calculated amount to be paid, the marble game server 205 may update the user database 201-2 to reflect that the amount held by the second terminal is charged from a game account owned by the second terminal within a predetermined number of times to be charged, for example, once, and allow the toll to be paid without a city or a building owned by the second terminal being sold.

When a city block to be purchased by the first terminal is the occupied city block associated with the second terminal, the marble game server 205 may allow the city block to be taken over by spending the amount to be paid, obtained by applying the second weight to the toll. That is, when the first character moved according to the rules of the game is located in the city block, and the city block landed on by the first character is the occupied city block associated with the second terminal, the marble game server 205 may place an inquiry with the first terminal to determine whether the occupied city block is purchased. When a command for purchasing a city is input from the first terminal, the marble game server 205 may update the user database 201-2 to reflect that the amount to be paid obtained by applying the second weight to the toll found in the game database 201-1 corresponding to the occupied city block is subtracted from the amount held by the first terminal to be added to the amount held by the second terminal, and determine the city block to be the occupied city block associated with the first terminal.

Here, prior to placing an inquiry with the first terminal to determine whether the occupied city block is purchased, the marble game server 205 may update the user database 201-2 to reflect that an amount corresponding to the toll applied to the occupied city block associated with the second terminal is subtracted from the amount held by the first terminal to be added to the amount held by the second terminal, and allow paying the toll to the second terminal regardless of purchasing the occupied city block.

Also, the marble game server 205 may increase the toll applied to the occupied city block by allowing a building to be constructed on the occupied city block. That is, the marble game server 205 may update the user database 201-2 to reflect that the building fee is subtracted, and allow the building to be constructed, for example, a villa, a building, a hotel, and a landmark in the occupied city block progressively as at least one of a condition of determining a city block to be the occupied city block, a condition of the first character being located in the occupied city blocks sequentially, and a condition of the first character being located in a departure point block sequentially is satisfied.

More particularly, under the condition of the first character being located in the departure point block, the marble game server 205 may give an opportunity to construct a building to the first character, with respect to a random occupied city block being held by the first character. When the villa, the building, and the hotel are constructed in advance in the random occupied city block that requests to construct the building, the marble game server 205 may give an additional opportunity to construct a landmark in a corresponding occupied city block to the first character.

Here, when the landmark is constructed in the occupied city block, the marble game server 205 may invalidate an attack event from the second terminal using the chance card, or invalidate a command for purchasing a city from the second terminal.

When a predetermined game time or a game turn passes, the marble game server 205 may update the user database 201-2 to reflect that the toll found in the game database 201-1 corresponding to the occupied city block associated with the first terminal is added to the amount held by the first terminal, and when the amount held by the first terminal is greater than the amount held by the second terminal, the marble game server 205 may determine the first terminal to be a winner of the marble game.

The marble game server 205 may arouse entertainment and interest in the game due to an unpredictability of winning prior to an end of the game, by determining a winner according to various rules, for example, an occupation rule with respect to a city block or a tourist site block, aside from determining the winner based on a result of comparing an amount held by each terminal subsequent to passing the predetermined game time or the game turn.

For example, when a number of the occupied city block group being maintained reaches a predetermined value, for example, "3", each of a plurality of city blocks aligned at a side of a polygon configuring the game board is determined to be the occupied city block associated with the first terminal, or each city block defined as the tourist site block is determined to be the occupied city block associated with the first terminal, the marble game server 205 may determine the first terminal to be a winner of the marble game.

As the first character provided to the first terminal passes the departure point block subsequent to passing through each plurality of city blocks on the game board sequentially, the marble game server 205 may update the user database 201-2 to reflect that the amount held by the first terminal is charged from the game account owned by the first terminal. For example, as the first character is relocated to the departure point block subsequent to departing from the departure point block, or passes via the departure point block on the game board in which a moving path is formed by aligning each block, the marble game server 205 may be provided with an opportunity to charge the amount held by the first terminal in a form of salary to the first character.

Also, the marble game server 205 may update the user database 201-2 to reflect that a predetermined amount is charged from the game account owned by the first terminal to the amount held by the first terminal with respect to the first terminal requesting participation in the game.

Although the system for providing the marble game 200 may provide a single game that supports a one-on-one match, the system for providing the marble game 200 should not be limited thereto and provide a team game that supports a multi-player to multi-player match.

Also, when the marble game is supported in a junior channel in which minors may participate, for example, a space where a game chamber may be created, the system for providing the marble game 200 may provide points to a winner terminal, and provide learning information with respect to a city as the city is purchased in a world map by the provided points.

Figure 3:
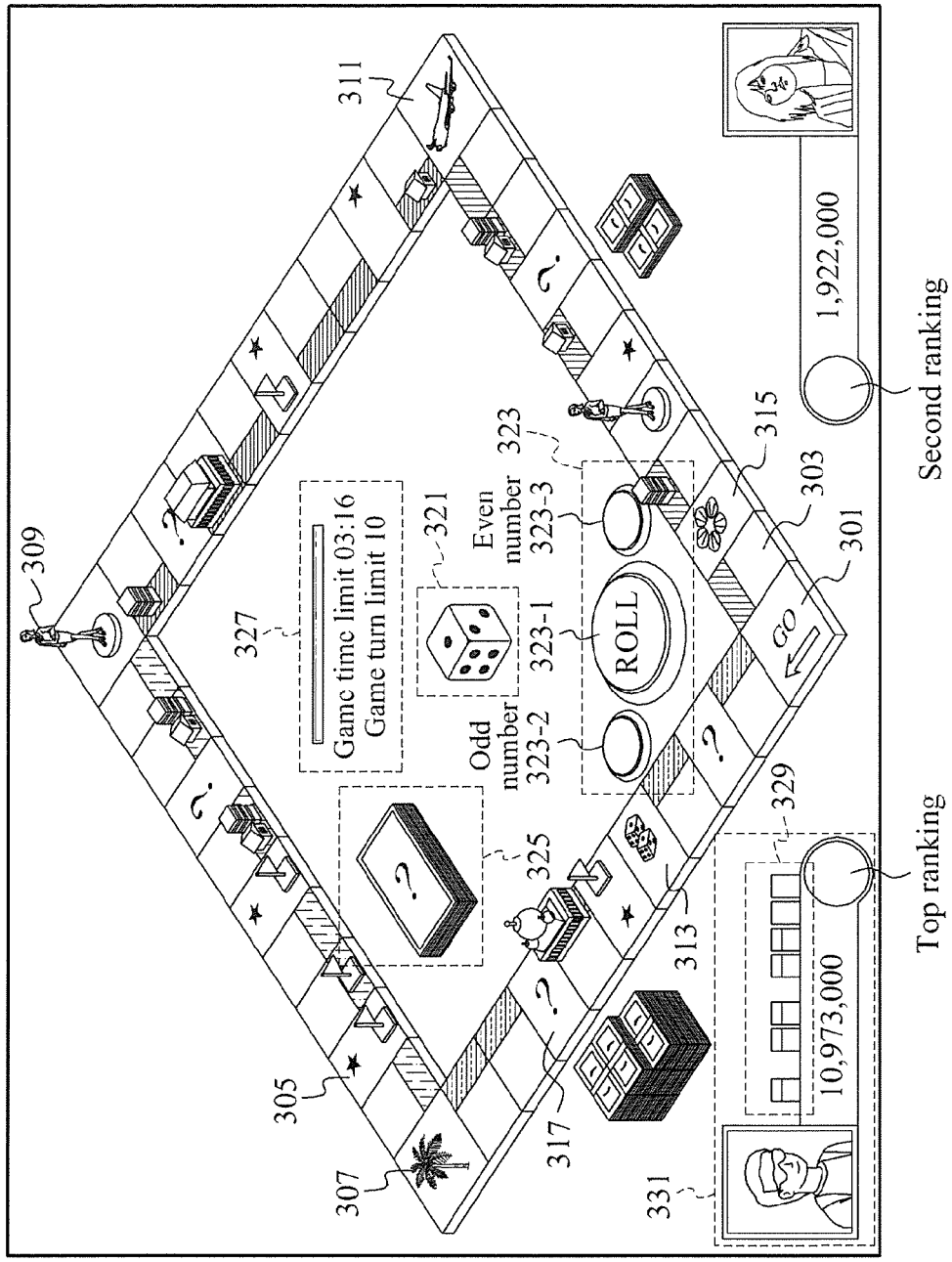
FIG. 3 is a diagram illustrating an example of a game board provided by a system for providing a marble game according to an embodiment of the present invention.

FIG. 3 is a diagram illustrating an example of a game board provided by a system for providing a marble game according to an embodiment of the present invention.

Referring to FIG. 3, the system for providing the marble game may provide a screen related to a game board including at least one of a departure point block 301, a city block 303, a tourist site block 305, a deserted island block 307, an Olympic block, a world travel block 311, a Macau block 313, a National Tax Service block 315, and a chance card block 317 in conjunction with a request to participate in a game. Here, the system for providing the marble game may provide a game board in which each block is aligned in a shape of a square.

Also, the system for providing the marble game may further display, on a screen, at least one of a dice area 321 in which a resulting value of dice is verified, a dice button area 323 in which dice are thrown, a chance card area 325 in which a chance card is located, a game time/game turn displaying area 327, a city area 329 in which a city card purchased is located, and a user information displaying area 331, for example, a user identification, an amount held, real estate holdings, a ranking of total assets, and the like, to provide the at least one to a first terminal and a second terminal.

Here, the system for providing the marble game may throw at least one die according to a selection command with respect to a dice button 323-1 in the dice button area 323 from a terminal, and move a character, corresponding to a resulting value of the dice. In this instance, the system for providing the marble game may control the resulting value of the dice based on a gauge control with respect to rolling the dice, for example, clicking on the dice button with respect to rolling the dice for a long period of time to obtain a resulting value of a high number or clicking on the dice button for a short period of time to obtain a resulting value of a low number, or a selection with respect to an odd/even number 323-2 and 323-3, for example, clicking on an odd number command to obtain a resulting value of odd number, or clicking on an even number command to obtain a resulting value of an even number.

For example, in case of the first terminal rolling the dice, when a toll of a second block is relatively high as an occupied city block associated with the second terminal based on a block landed on by a first character corresponding to the first terminal, the system for providing the marble game may select the odd number 323-2 in the first terminal, operate the selection command with respect to the dice button 323-1 to provide the resulting value of odd number, for example, "1", "3", or "5", that determines a moving position, and thereby allow the first terminal to prevent the first character from being located in the second block that is not desired by the first terminal.

Also, the system for providing the marble game may provide an authority to perform the dice additionally when resulting values of two dice are identical, that is, so called doubles.

Figure 4:
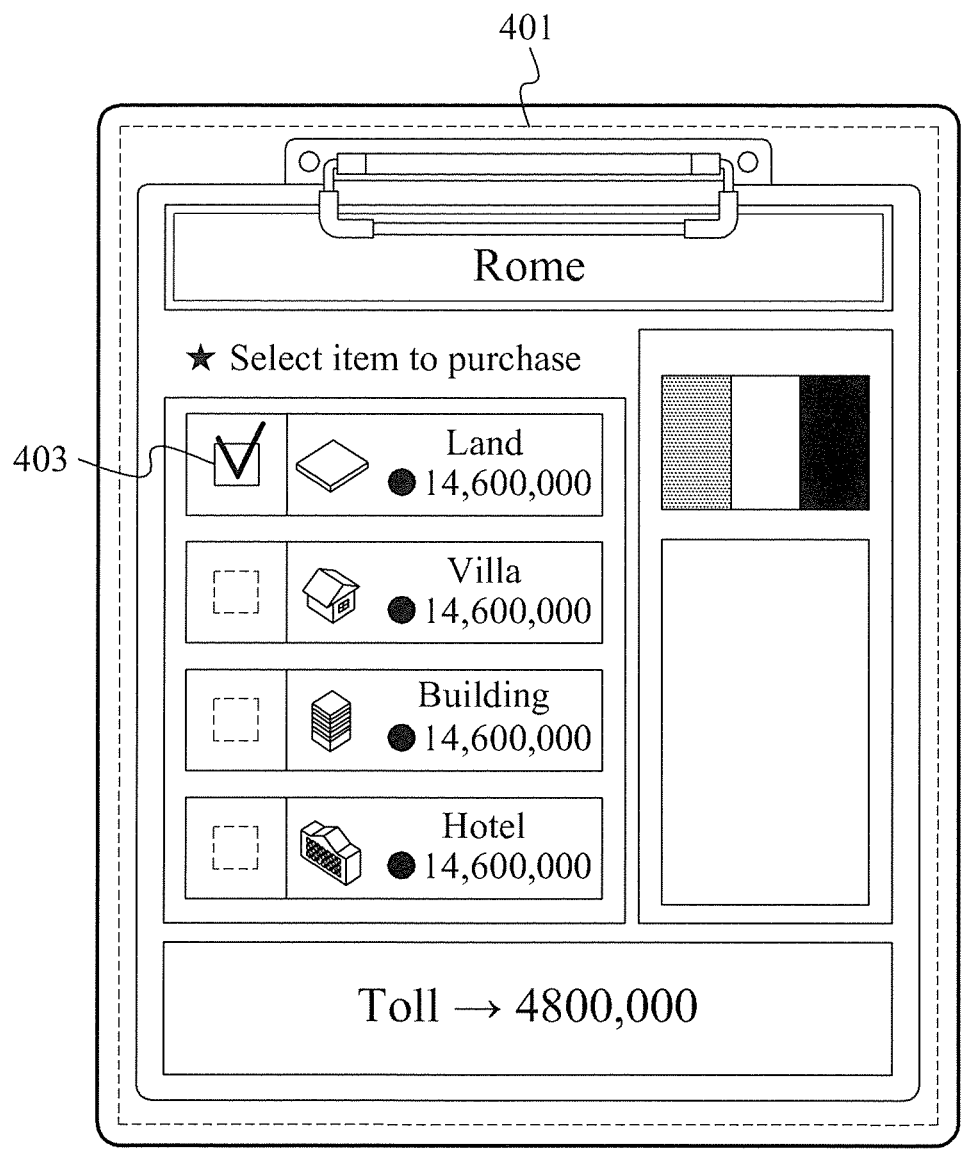
FIG. 4 is a diagram illustrating an example of occupation with respect to a city block in a system for providing a marble game according to an embodiment of the present invention.

FIG. 4 is a diagram illustrating an example of occupation with respect to a city block in a system for providing a marble game according to an embodiment of the present invention.

Referring to FIG. 4, when the first character provided to the first terminal is located in a city block according to a rule of the game, the system for providing the marble game may place an inquiry with the first terminal to determine whether the city block landed on by the first character is purchased, and when a command for purchasing a city is input from the first terminal, the system for providing the marble game may update a user database to reflect that a property fee with respect to the city block is subtracted from an amount held by the first terminal, and determine the city block to be an occupied city block associated with the first terminal.

For example, when the first character provided to the first terminal is located in the city block, the system for providing the marble game may provide a purchasing page 401 including a selection field that verifies whether "a land, a villa, a building, or a hotel" is to be purchased. In addition, when the selection field 403 activated with respect to the "land" is verified, the system for providing the marble game may complete purchasing by determining the city block to be the occupied city block associated with the first terminal by paying the property fee with respect to the city block.

Subsequently, when the first character is located in the occupied city block sequentially over the plurality of city blocks on the game board, the system for providing the marble game may provide the purchasing page 401 that activates sequentially whether the "villa, the building, or the hotel" is purchased, and when the activated selection field is verified, the system for providing the marble game may allow purchasing of the building by payment of a building fee corresponding to a building.

Also, when the first character is located in the occupied city block sequentially over the plurality of city blocks on the game board, subsequent to constructing a total of the "villa, the building, or the hotel" as the "villa, the building, or the hotel" is progressively purchased, the system for providing the marble game may allow purchasing of a landmark, and provide a benefit involved in constructing the landmark, for example, invalidating an attack event, invalidating the command for purchasing the city in another terminal, and the like.

Figure 5:
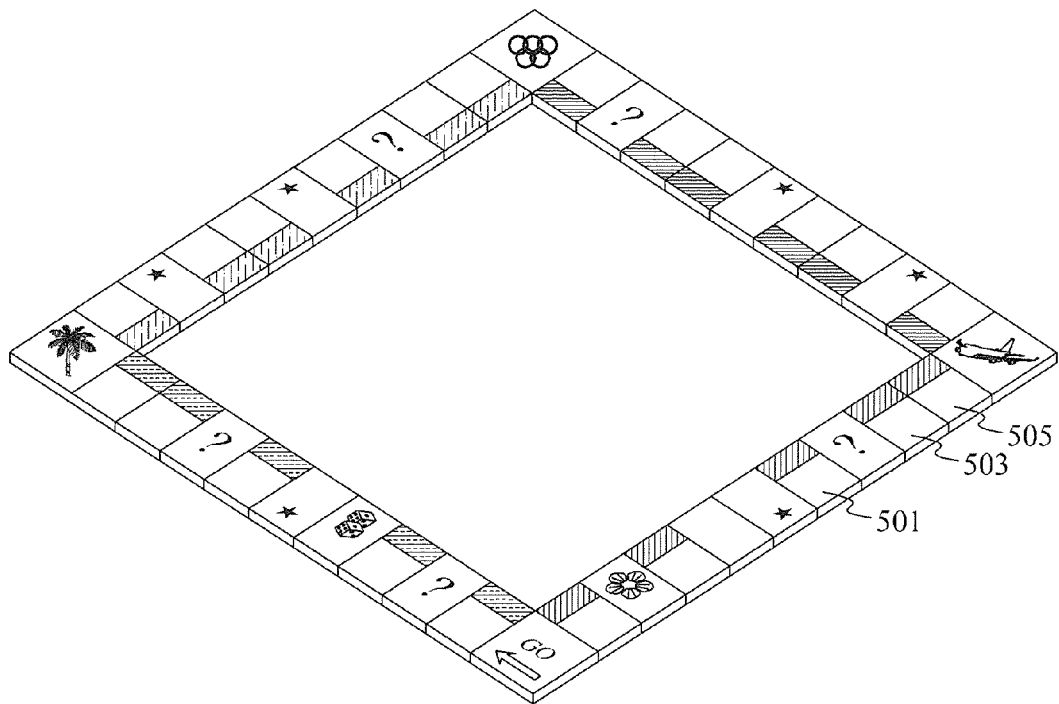
FIG. 5 is a diagram illustrating an example of grouping with respect to occupied city blocks in a system for providing a marble game according to an embodiment of the present invention.

FIG. 5 is a diagram illustrating an example of grouping with respect to occupied city blocks in a system for providing a marble game according to an embodiment of the present invention.

Referring to FIG. 5, when a first character moved according to a rule of the game is located on a city block, the system for providing the marble game may determine the city block to be an occupied city block associated with a first terminal subsequent to a purchase, and set a plurality of occupied city blocks satisfying a predetermined property to be an occupied city block group by grouping the plurality of occupied city blocks.

Here, the system for providing the marble game may set the city block as the occupied city block group by determining that the predetermined property is satisfied when a color is assigned to each city block, each plurality of city blocks to which an identical color is assigned is the occupied city block, or at least n pluralities of city blocks aligned adjacent to each other are each determined to be the occupied city blocks. For example, when a "third blue city block" 505 is determined to be an occupied city block associated with the first terminal, and a "first blue city block" 501 and a "second blue city block" 503 are the occupied city blocks associated with the first terminal in advance, the system for providing the marble game may set the "first blue city block 501, the second blue city block 503, and the third blue city block 505" as an occupied city block group by determining that the predetermined property is satisfied as each of the "first blue city block 501, the second blue city block 503, and the third blue city block 505" is determined to be the occupied city block.

When the city block landed on by the second character over the plurality of city blocks is the occupied city block group, the system for providing the marble game may calculate an amount to be paid by applying a first weight to a toll found in a game database corresponding to the occupied city block, and subtract the calculated amount to be paid from an amount held by the second terminal to be added to the amount held by the first terminal.

Figure 6:
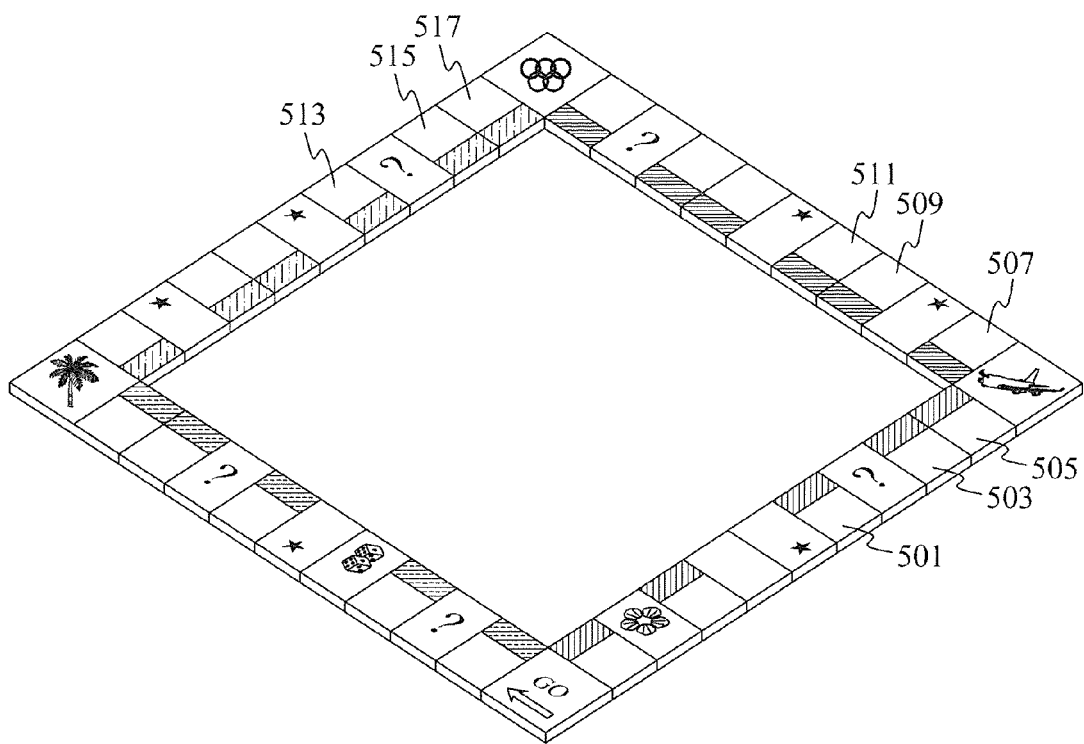
FIG. 6 is a diagram illustrating an example of winning in a system for providing a marble game according to an embodiment of the present invention.

FIG. 6 is a diagram illustrating an example of winning in a system for providing a marble game according to an embodiment of the present invention.

Referring to FIG. 6, when a number of occupied city blocks being maintained reaches a predetermined value, for example, "3", associated with a first terminal, the system for providing the marble game may determine the first terminal to be a winner.

For example, when a "first city block 501, a second city block 503, and a third city block 505" in "blue" are grouped to be an occupied city block group, a "fourth city block 507, a fifth city block 509, and a sixth city block 511" in "red" are grouped to be an occupied city block group, and a "seventh city block 513, an eighth city block 515, and a ninth city block 517" in "green" are grouped to be an occupied city block group, the system for providing the marble game may determine the first terminal to be a winner regardless of a remaining game time or a game turn as a number of the occupied city block group satisfies "3" currently.

Figure 7:
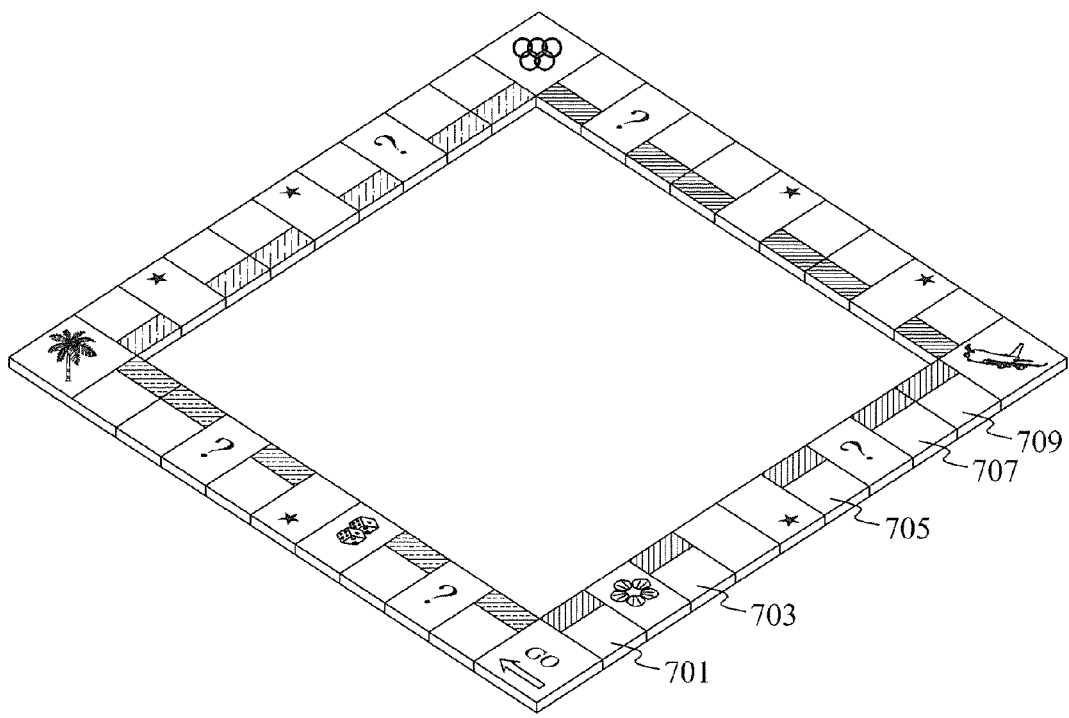
FIG. 7 is a diagram illustrating another example of winning in a system for providing a marble game according to an embodiment of the present invention.

FIG. 7 is a diagram illustrating another example of winning in a system for providing a marble game according to an embodiment of the present invention.

Referring to FIG. 7, when each of a plurality of city blocks aligned at a side of a polygon configuring a game board is determined to be an occupied city block associated with a first terminal, the system for providing the marble game may determine the first terminal to be a winner.

For example, when each of city blocks 701 to 709 located at a side of a square is determined to be an occupied city block associated with the first terminal on a game board in which each block is aligned in a shape of a square, the system form providing the marble game may determine the first terminal to be a winner.

Figure 8:
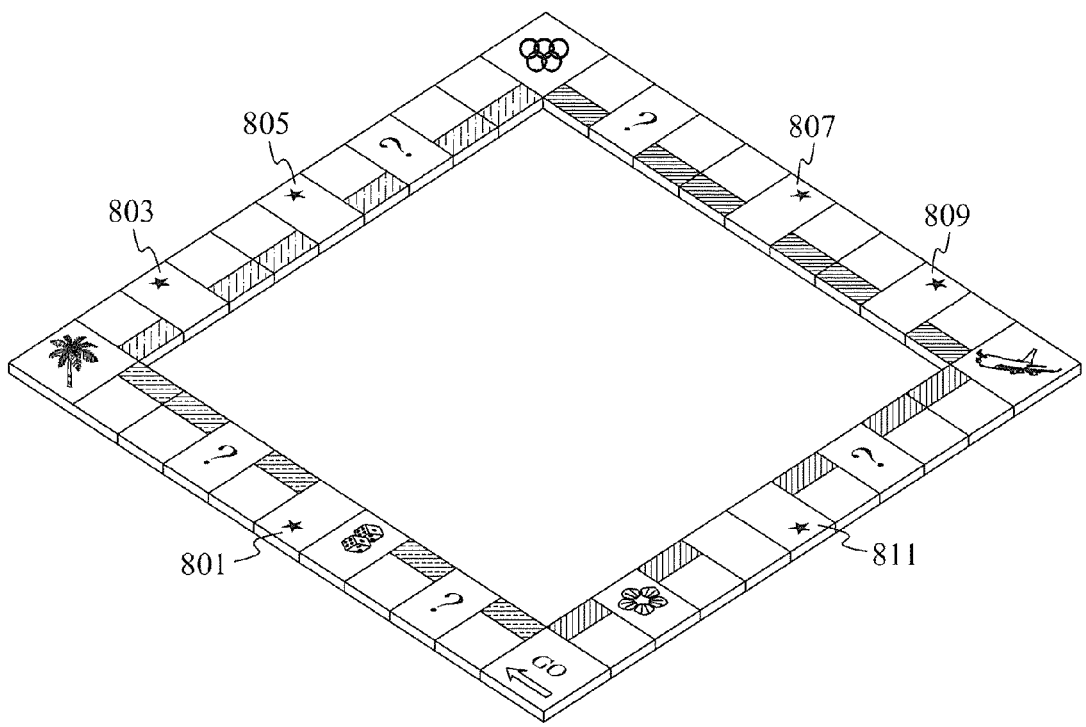
FIG. 8 is a diagram illustrating still another example of winning in a system for providing a marble game according to an embodiment of the present invention.

FIG. 8 is a diagram illustrating still another example of winning in a system for providing a marble game according to an embodiment of the present invention.

Referring to FIG. 8, when each city block defined as a tourist site in a game board, that is, a tourist site block, is determined to be an occupied city block associated with a first terminal, the system for providing the marble game may determine the first terminal to be a winner of a marble game.

For example, when at least one of tourist blocks 801 to 807 located on each side of a square is determined to be an occupied city block associated with the first terminal on a game board in which each block is aligned in a shape of a square, the system for providing the marble game may determine the first terminal to be a winner of a marble game.

Figure 9:
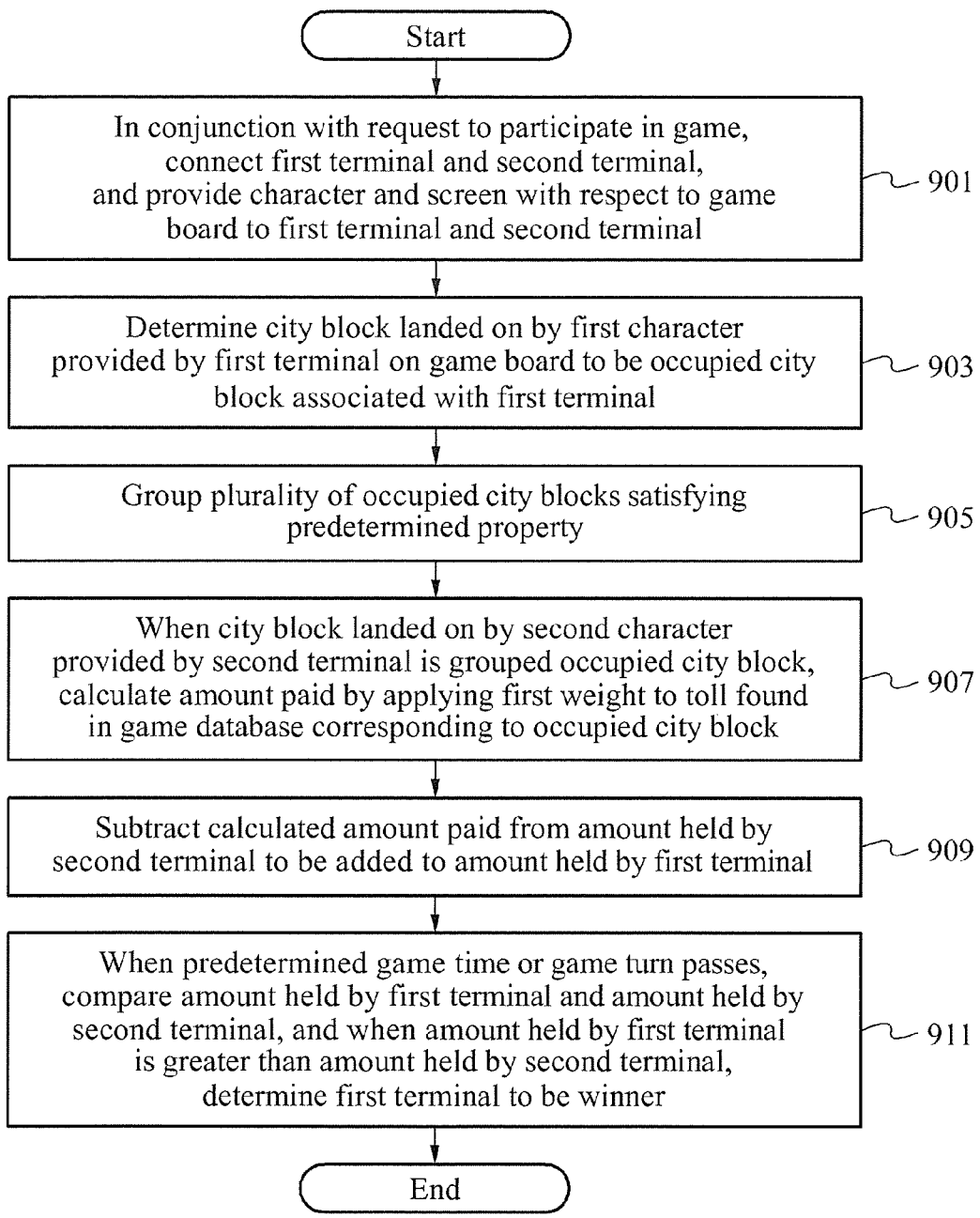
FIG. 9 is a flowchart illustrating a method for providing a marble game according to an embodiment of the present invention.

FIG. 9 is a flowchart illustrating a method for providing a marble game according to an embodiment of the present invention. Here, a game database of a system for providing a marble game may store data with respect to at least one of a plurality of characters, a plurality of city blocks, a toll levied corresponding to the plurality of city blocks, and a game board formed by aligning blocks including the plurality of city blocks. Also, the system for providing the marble game may store an amount held by the first terminal and a second terminal associated with a game in a user database.

Referring to FIG. 9, in operation 901, the system for providing the marble game may connect the first terminal and the second terminal in conjunction with a request to participate in the game, and extract a first character corresponding to the first terminal and a second character corresponding to the second terminal. Further, in operation 901, the system for providing the marble game may provide the first character, the second character, and a screen related to the game board to the first terminal and the second terminal.

The system for providing the marble game may provide the screen related to the game board including at least one of a departure point block, a city block, a tourist site block, a deserted island block, an Olympic block, a world travel block, a Macau block, a National Tax Service block, and a chance card block to the first terminal and the second terminal. Here, the system for providing the marble game may provide a game board in which each block is in a shape of, for example, a square.

The system for providing the marble game may move the first character corresponding to the first terminal and the second character corresponding to the second terminal along a moving path formed by each block in the game board, according to a rules of the game. For example, the system for providing the marble game may move the first character or the second character, corresponding to a resulting value of performing a dice by the first terminal or the second terminal.

In operation 903, the system for providing the marble game may determine the city block landed on by the first character sequentially over the plurality of city blocks to be an occupied city block associated with the first terminal.

That is, when the first character is located in a city block, for example, a city block for each country, according to the rules of the game, the system for providing the marble game may place an inquiry with the first terminal to determine whether the city block landed on by the first character is purchased, and when a command for purchasing a city is input from the first terminal, the system for providing the marble game may update a user database to reflect that a property fee with respect to a city block is subtracted from an amount held by the first terminal, and determine the city block to be the occupied city block associated with the first terminal.

Here, when the first character is located in the occupied city block associated with the second terminal according to the rules of the game, the system for providing the marble game may place an inquiry with the first terminal to determine whether the occupied city block is purchased. When the command for purchasing the city is input from the first terminal, the system for providing the marble game may update the user database to reflect that an amount to be paid obtained by applying a second weight to a toll found in the game database corresponding to the occupied city block is subtracted from the amount held by the first terminal, and determine the city block to be the occupied city block associated with the first terminal.

Subsequently, the system for providing the marble game may update the user database to reflect that a building fee is subtracted, and construct a villa, a building, a hotel, and a landmark in the occupied city block, in such an order, when at least one of a condition of determining the city block to be the occupied city block, a condition of the first character being located in the occupied city block on the game board, and a condition of the first character being located in the departure point block on the game board is satisfied. Here, when the landmark is constructed in the occupied city block, the system for providing the marble game may invalidate an attack event from the second terminal using a chance card, or invalidate the command for purchasing the city from the second terminal.

Also, when the first character moved according to the rules of the game is located in the tourist site block, for example, an island block, or a beach block, the system for providing the marble game may place an inquiry with the first terminal to determine whether the tourist site block landed on by the first character is purchased, and when the command for purchasing the city is input from the first terminal, the system for providing the marble game may update the user database to reflect that the property fee with respect to the tourist site block is subtracted from the amount held by the first terminal, and determine the tourist site block to be the occupied city block associated with the first terminal.

When the first character moved according to the rules of the game is located in the deserted island block, the system for providing the marble game may restrict a movement of the first character during a predetermined game turn, for example, "3" turns, and allow an escape from the deserted island by using a specific method, for example, paying an escape fee, using an escape card, and the like, when resulting values of two dice are identical, that is, so called doubles.

When the first character moved according to the rules of the game is located in the Olympic block, the system for providing the marble game may place an inquiry with the first terminal to determine whether the Olympics is hosted with respect to a desired city, for example, one of the occupied city blocks associated with the first terminal. Also, when a command for hosting the Olympics is input from the first terminal, the system for providing the marble game may update the user database to reflect that an event fee involved in hosting the Olympics is subtracted from the amount held by the first terminal, and increase the toll with respect to the city according to hosting the Olympics.

When the first character moved according to the rules of the game is located in the world travel block, the system for providing the marble game may allow the first character to move to a desired block.

When the first character moved according to the rules of the game is located in the Macau block, the system for providing the marble game may provide a reward through a random game. For example, the system for providing the marble game may provide the reward by determining whether a card number of each aligned card is higher or lower than a predetermine number, and update the user database to reflect that the reward is to be added to the amount held by the first terminal.

When the first character moved according to the rules of the game is located in the National Tax Service block, the system for providing the marble game may collect a portion of real estate owned by the first terminal, for example, 5% of occupied cities, buildings, or tourist sites, and update the user database to reflect that the collected fee is subtracted from the amount held by the first terminal.

When the first character moved according to the rules of the game is located in the chance card block, the system for providing the marble game may allow the first character to use the chance card. Here, the system for providing the marble game may provide a single card selected randomly from chance cards that create a variety of events to the first terminal.

The system for providing the marble game may utilize at least one of a property fee paid in determining a city block to be the occupied city block, a building fee with respect to a building constructed in the occupied city block, and an event fee involved in hosting a festival or the Olympics in the occupied city block, in calculating the toll with respect to the occupied city block, and update the game database to store the calculated toll.

In operation 905, the system for providing the marble game may set a plurality of occupied city blocks satisfying a predetermined property as an occupied city block group. When a color is assigned to each city block, each plurality of city blocks to which an identical color is assigned is determined to be the occupied city block, or at least n pluralities of city blocks aligned adjacent to each other is each determined to be the occupied city block, the system for providing the marble game may determine the each city block to be an occupied city block group by determining that the predetermined property is satisfied. For example, when each of a "first blue city block", a "second blue city block", and a "third blue city block" is determined to be the occupied city block, the system for providing the marble game may set the "first blue city block", the "second blue city block", and the "third blue city block" as the occupied city block group.

In operation 907, when a city block landed on by the second character sequentially on the game board is the occupied city block group, the system for providing the marble game may calculate an amount to be paid by applying the first weight to the toll found in the game database corresponding to the occupied city block.

In operation 909, the system for providing the marble game may subtract the amount to be paid that is calculated as a toll to be paid by the second terminal, that is, an amount obtained by applying the first weight to the toll corresponding to the city block when a city block landed on by the second character is the occupied city block group on the game board, from the amount held by the second terminal, and update the user database to be added to the amount held by the first terminal. Here, when the amount held by the second terminal is less than the calculated amount to be paid, the system for providing the marble game may update the user database to reflect that the amount held by the second terminal is charged from the game account owned by the second terminal.

As the first character passes the departure point block along the game board, the system for providing the marble game may update the user database to reflect that the amount held by the first terminal is charged from the game account owned by the first terminal.

Also, the system for providing the marble game may update the user database to reflect that a predetermined amount is charged from the game account owned by the first terminal to the amount held by the first terminal, with respect to the first terminal requesting participation in the game.

In operation 911, when a predetermined game time or the game turn passes, the system for providing the marble game may compare the amount held by the first terminal and the amount held by the second terminal, and when the amount held by the first terminal is greater than the amount held by the second terminal, the system for providing the marble game may determine the first terminal to be a winner. Here, as the predetermined game time or the game turn passes, the system for providing the marble game may update the user database to reflect that the toll found in the game database corresponding to the occupied city block associated with the first terminal is added to the amount held by the first terminal, and compare the amount held by the first terminal and the amount held by the second terminal.

Further, when a number of the occupied city block groups being maintained reaches a predetermined number, each plurality of city blocks aligned at a side of a polygon configuring the game board is determined to be the occupied city block associated with the first terminal, or a city block defined as a tourist site is determined to be the occupied city block associated with the first terminal, the system for providing the first terminal may determine the first terminal to be a winner.

The units described herein may be implemented using hardware components, software components, or a combination thereof. For example, a processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

EXPLANATION OF SYMBOLS

200: System for providing a marble game
201: Database
203: Network connecting unit
205: Marble game server

What is claimed is:

1. A system for providing a marble game, the system comprising:
    a game database to store data related to a plurality of characters, a plurality of city blocks, a color assigned to each of the plurality of city blocks, a toll levied corresponding to each of the plurality of city blocks, and a game board formed by aligning the plurality of city blocks;
    a network connection server to connect a first terminal and a second terminal in conjunction with a request to participate in a game, extract a first character corresponding to the first terminal and a second character corresponding to the second terminal from the game database, and provide the first character, the second character, and a screen related to the game board to the first terminal and the second terminal;
    a dice button to roll a dice to move the characters on the plurality of city blocks, when activated for an activation time;
    a gauge control to measure the activation time of the dice button; and
    a marble game server in communication with the network connection server and the gauge control to determine a city block landed on by the first character in the plurality of city blocks to be an occupied city block associated with the first terminal, and sets n occupied city blocks of the same color as an occupied city block group, where n is an integer number greater than or equal to 3, wherein the marble game server controls a resulting value of said rolling of the dice based on the activation time of the dice button measured by the gauge control, wherein the resulting value of said rolling of the dice is higher when the activation time is longer and lower when the activation time is shorter,
    wherein the marble game server calculates an amount to be paid by the second character to the first character by applying a first weight to a toll obtained from the game database corresponding to the occupied city block when a block landed on by the second character in the plurality of city blocks is an occupied city block of the first terminal included in the occupied city block group and,
    wherein the marble game server determines, relating to the first terminal, the first terminal to be a winner of the marble game when a number of occupied city blocks of the first terminal is determined to reach a predetermined value, or every city block defined as a tourist site is occupied.

2. The system of claim 1, wherein the marble game server sets every city block to which an identical color is assigned as the occupied city block group when every city block to which the identical color is assigned is determined to be an occupied city block associated with the first terminal.

3. The system of claim 1, wherein the marble game server utilizes at least one of a property fee paid in determining the city block to be the occupied city block, a building fee with respect to a building constructed in the occupied city block, and an event fee involved for holding a festival or Olympics in the occupied city block, when calculating the toll corresponding to the occupied city block, and updates the game database for the calculated toll to be stored.

4. The system of claim 1, further comprising:
    a user database to store data related to an amount held by the first terminal and the second terminal,
    wherein the marble game server subtracts the calculated amount to be paid from the amount held by the second terminal, and updates the user database to reflect that the calculated amount to be paid is added to the amount held by the first terminal.

5. The system of claim 4, wherein the marble game server updates the user database to add a toll obtained from the game database corresponding to the occupied city block in the amount held by the first terminal and the second terminal, and when the amount held by the first terminal is greater than the amount held by the second terminal, determines the first terminal to be a winner of the marble game.

6. The system of claim 4, wherein the marble game server places an inquiry with the first terminal to determine whether a city block in which the first character is located is purchased, and when a command for purchasing a city block is input from the first terminal, the user database is updated to reflect that a property fee with respect to the city block is subtracted from the amount held by the first terminal, and the city block is determined to be an occupied city block associated with the first terminal.

7. The system of claim 4, wherein when the city block in which the first character is located is an occupied city block associated with the second terminal, the marble game server places an inquiry with the first terminal to determine whether the occupied city block is purchased, and when a command for purchasing a city is input from the first terminal, the user database is updated to reflect an amount to be paid obtained by applying a second weight to a toll found in the game database corresponding to the occupied city block is subtracted from the amount held by the first terminal to be added to the amount held by the second terminal, and determine the city block to be an occupied city block associated with the first terminal.

8. The system of claim 4, wherein the marble game server updates the user database to reflect that a building fee is subtracted, and at least one of a villa, a building, a hotel, and a landmark is constructed in the occupied city block when at least one of a condition of determining a city block to be an occupied city block, a condition of the first character being located in the occupied city block, and a condition of the first character being located in a departure point block, is satisfied.

9. The system of claim 8, wherein the marble game server invalidates an attack event from the second terminal using a chance card, or invalidates a command for purchasing a city block from the second terminal when a landmark is constructed on the occupied city block.

10. The system of claim 4, wherein the marble game server updates the user database to charge the amount held by the first terminal and the second terminal from a game account owned by the second terminal, within a predetermined number when the amount held by the second terminal is less than the calculated amount to be paid.

11. The system of claim 4, wherein the marble game server updates the user database to reflect that the amount held by the first terminal and the second terminal is charged from the game account owned by the first terminal as the first character passes a departure point block.

12. The system of claim 4, wherein the marble game server updates the user database to reflect that a predetermined amount from a game account owned by the first terminal is charged to the amount held by the first terminal and the second terminal, with respect to the first terminal requesting to participate in the game.

13. A system for providing a marble game, the system comprising:
a network connection server to connect a first terminal and a second terminal in conjunction with a request to participate in a game, extract a first character corresponding to the first terminal and a second character corresponding to the second terminal, provide a screen related to a game board formed by aligning the first character, the second character, and a plurality of city blocks to the first terminal and the second terminal, and store a color assigned to each of the plurality of city blocks;
a dice button to roll a dice to move the characters on the plurality of city blocks, when activated for an activation time;
a gauge control to measure the activation time of the dice button; and
a marble game server to place an inquiry with the first terminal to determine whether a landmark is constructed when a villa, a building, and a hotel are constructed in a city block landed on by the first character in the plurality of city blocks, and when a command for constructing the landmark is input from the first terminal, update the user database to reflect that a building fee with respect to the landmark is subtracted from the amount held by the first terminal, and construct the landmark in lieu of the villa, the building, and the hotel, wherein the marble game server controls a resulting value of said rolling of the dice based on the activation time of the dice button measured by the gauge control, wherein the resulting value of said rolling of the dice is higher when the activation time is longer and lower when the activation time is shorter,
wherein the marble game server sets, a plurality of occupied city blocks of which at least n city blocks are of the same color as an occupied city block group, where n is an integer number greater than or equal to 3, calculates an amount to be paid by the second character to the first character when a block landed on by the second character is an occupied city block of the first terminal, by applying a first weight to a toll corresponding to the occupied city block included in the occupied city block group, and wherein
the marble game server determines, relating to the first terminal, the first terminal to be a winner of a marble game when a number of occupied city blocks of the first terminal is determined to reach a predetermined value, or every city block defined as a tourist site is occupied.

14. A system for providing a marble game, the system comprising:
a network connection server to connect a first terminal and a second terminal in conjunction with a request to participate in a game, extract a first character corresponding to the first terminal and a second character corresponding to the second terminal, provide a screen related to a game board formed by aligning the first character, the second character, and a plurality of city blocks to the first terminal and the second terminal, and store a color assigned to each of the plurality of city blocks;
a dice button to roll a dice to move the characters on the plurality of city blocks, when activated for an activation time;
a gauge control to measure the activation time of the dice button; and
a marble game server to place an inquiry with the first terminal to determine whether an occupied city block is purchased when a city block is landed on by the first character in the plurality of city blocks, and when a command for purchasing a city is input from the first terminal, update the user database to reflect an amount to be paid obtained by applying a second weight to a toll found in the game database corresponding to the occupied city block is subtracted from the amount held by the first terminal to be added to the amount held by the second terminal, and determine the city block to be the occupied city block associated with the first terminal, wherein the marble game server controls a resulting value of said rolling of the dice based on the activation time of the dice button measured by the gauge control, wherein the resulting value of said rolling of the dice is higher when the activation time is longer and lower when the activation time is shorter, wherein the marble game server sets, a plurality of occupied city blocks of which at least n city blocks are of the same color as an occupied city block group, where n is an integer number greater than or equal to 3, and calculates an amount to be paid by the second character to the first character when a block landed on by the second character is an occupied city block of the first terminal, by applying a first weight to a toll corresponding to the occupied city block included in the occupied city block group, and wherein the marble game server determines, relating to the first terminal, the first terminal to be a winner of a marble game when a number of occupied city blocks of the first terminal is determined to reach a predetermined value, or every city block defined as a tourist site is occupied.

15. A method for providing a marble game, the method comprising:

storing data related to a game board formed by aligning a plurality of characters, a plurality of city blocks, a toll levied corresponding to each of the plurality of city blocks, a color assigned to each of the plurality of city blocks, and a game board formed by aligning the plurality of city blocks;

connecting a first terminal and a second terminal in conjunction with a request to participate in a game, and extracting a first character corresponding to the first terminal and a second character corresponding to the second terminal from the game database;

providing the first character, the second character, and a screen related to the game board to the first terminal and the second terminal;

generating a number for a dice roll to move the characters on the plurality of city blocks, responsive to a dice button activated for an activation time;

measuring the activation time of the dice button by a gauge control;

controlling a resulting value of said rolling of the dice based on the activation time of the dice button measured by the gauge control, wherein the resulting value of said rolling of the dice is higher when the activation time is longer and lower when the activation time is shorter;

determining a city block landed on by the first character in the plurality of city blocks to be an occupied city block associated with the first terminal;

setting n, occupied city blocks of the same color as an occupied city block group, where n is an integer number greater than or equal to 3;

calculating an amount to be paid by the second character to the first character by applying a first weight to a toll found in the game database corresponding to the occupied city block when a city block landed on by the second character in the plurality of city blocks is an occupied city block of the first terminal included in the occupied city block group; and determining, relating to the first terminal, the first terminal to be a winner of a marble game when a number of occupied city blocks of the first terminal is determined to reach a predetermined value, or every city block defined as a tourist site is occupied.

16. The method of claim 15, wherein setting of the occupied city blocks as the occupied city block group comprises:

setting, among the plurality of city blocks, every city block to which an identical color is assigned as the occupied city block group when every city block to which the identical color is assigned is determined to be an occupied city block associated with the first terminal.

17. The method of claim 15, further comprising:

calculating the toll with respect to the occupied city block, by utilizing at least one of a property fee paid in the determining the city block to be the occupied city block, a building fee with respect to a building constructed in the occupied city block, and an event fee involved in holding a festival or Olympics in the occupied city block; and updating the game database to reflect the calculated toll to be stored.

18. The method of claim 15, further comprising:

storing data with respect to an amount held by the first terminal and the second terminal in a user database associated with a game; and updating the user database to reflect that the calculated amount to be paid is subtracted from the amount held by the second terminal to be added to the amount held by the first terminal.

19. The method of claim 18, further comprising:

when a predetermined game time or a game turn passes, updating the user database to reflect that a toll found in a game database corresponding to the occupied city block is added to the amount held by the first terminal and the second terminal; and determining the first terminal to be a winner of the marble game when the amount held by the first terminal is greater than the amount held by the second terminal.

20. The method of claim 18, further comprising:

placing an inquiry with the first terminal to determine whether a city block in which the first character is located is purchased;

updating the user database to reflect that a property fee is subtracted with respect to the city block from the amount held by the first terminal when a command for purchasing a city block is input from the first terminal; and determining the city block to be the occupied city block associated with the first terminal.

21. The method of claim 18, further comprising:

placing an inquiry with the first terminal to determine whether the occupied city block is purchased when the first character is located in the occupied city block associated with the second terminal;

updating the user database to reflect that an amount to be paid obtained by applying a second weight to a toll found in the game database corresponding to the occupied city block is subtracted from the amount held by the first terminal to be added to the amount held by the second terminal when a command for purchasing a city block is input from the first terminal; and determining the city block to be the occupied city block associated with the first terminal.

22. The method of claim 18, further comprising:
updating the user database to reflect that a building fee is subtracted when at least one of a condition of determining the city block to be the occupied city block, a condition of the first character being located in the occupied city block, and a condition of the first character being located in a departure point block, is satisfied; and
constructing at least one of a villa, a building, a hotel, and a landmark in the occupied city block.

23. The method of claim 22, further comprising:
invalidating an attack event from the second terminal using a chance card when a landmark is constructed in the occupied city block, or invalidating a command for purchasing a city from the second terminal.

24. The method of claim 18, further comprising:
updating the user database to reflect that the amount held is charged from a game account owned by the second terminal, is within a predetermined number of charging when the amount held by the second terminal is less than the calculated amount to be paid.

25. The method of claim 18, further comprising:
updating the user database to reflect that the amount held by the first terminal and the second terminal is charged from a game account owned by the first terminal as the first character passes a departure point block.

26. The method of claim 18, further comprising:
updating the user database to reflect that a predetermined amount from a game account owned by the first terminal with respect to the first terminal requesting to participate in a game is charged to the amount held by the first terminal and the second terminal.

27. A non-transitory computer-readable medium comprising a set of instructions executed by a computer, the set of instructions when executed by said computer causing said computer to perform:
storing data related to a game board formed by aligning a plurality of characters, a plurality of city blocks, a toll levied corresponding to each of the plurality of city blocks, a color assigned to each of the plurality of city blocks, and a game board formed by aligning the plurality of city blocks;
connecting a first terminal and a second terminal in conjunction with a request to participate in a game, and extracting a first character corresponding to the first terminal and a second character corresponding to the second terminal from the game database;
providing the first character, the second character, and a screen related to the game board to the first terminal and the second terminal;
generating a number for a dice roll to move the characters on the plurality of city blocks, responsive to a dice button activated for an activation time;
measuring the activation time of the dice button by a gauge control;
controlling a resulting value of said rolling of the dice based on the activation time of the dice button measured by the gauge control, wherein the resulting value of said rolling of the dice is higher when the activation time is longer and lower when the activation time is shorter;
determining a city block landed on by the first character in the plurality of city blocks to be an occupied city block associated with the first terminal;
setting n occupied city blocks of the same color as an occupied city block group, where n is an integer number greater than or equal to 3;
calculating an amount to be paid by the second character to the first character by applying a first weight to a toll found in the game database corresponding to the occupied city block when a city block landed on by the second character in the plurality of city blocks is an occupied city block of the first terminal included in the occupied city block group; and
determining, relating to the first terminal, the first terminal to be a winner of a marble game when a number of occupied city blocks of the first terminal is determined to reach a predetermined value, or every city block defined as a tourist site is occupied.

* * * * *